United States Patent [19]
Davis et al.

[11] Patent Number: 5,937,388
[45] Date of Patent: Aug. 10, 1999

[54] SYSTEM AND METHOD FOR PERFORMING SCALABLE DISTRIBUTION OF PROCESS FLOW ACTIVITIES IN A DISTRIBUTED WORKFLOW MANAGEMENT SYSTEM

[75] Inventors: James W. Davis, Sunnyvale; Weimin Du, San Jose; Ming-Chien Shan, Saratoga; Nicolas Sheard, Palo Alto, all of Calif.

[73] Assignee: Hewlett-Packard Company, Palo Alto, Calif.

[21] Appl. No.: 08/828,208

[22] Filed: Mar. 21, 1997

Related U.S. Application Data

[60] Provisional application No. 60/032,567, Dec. 5, 1996.
[51] Int. Cl.$^6$ .................................................. G06F 17/60
[52] U.S. Cl. ................ 705/8; 705/1; 705/9; 395/182.13; 395/185.24
[58] Field of Search .................................. 705/1, 8, 10, 7, 705/9; 395/182.13, 185.04, 200.31; 707/202, 512

[56] References Cited

U.S. PATENT DOCUMENTS

| | | | |
|---|---|---|---|
| 5,072,401 | 12/1991 | Sansone et al. ............................. | 705/8 |
| 5,287,501 | 2/1994 | Lomet ...................................... | 707/202 |
| 5,408,470 | 4/1995 | Rothrock et al. ........................ | 707/512 |
| 5,412,806 | 5/1995 | Du et al. ..................................... | 707/2 |
| 5,546,571 | 8/1996 | Shan et al. .................................. | 707/3 |
| 5,627,764 | 5/1997 | Schutzman et al. ............... | 395/200.37 |
| 5,675,785 | 10/1997 | Hall et al. ............................. | 707/102 |
| 5,787,437 | 7/1998 | Potterveld et al. .................... | 707/103 |
| 5,809,507 | 9/1998 | Cavanaugh et al. .................... | 707/103 |
| 5,826,239 | 10/1998 | Du et al. ..................................... | 705/8 |

Primary Examiner—James P. Trammell
Assistant Examiner—Cuong H. Nguyen

[57] ABSTRACT

A system and method for performing scalable distribution of process flow activities in a distributed workflow management system is described. The distributed workflow management system operates over the computer network which includes a plurality of interconnected computers. Each computer includes a processor, memory and input/output facilities. A plurality of resources are each operatively coupled to at least one of the computers and execute at least one of the activities in the process flow. A process flow engine, including a database in which is stored data used in effecting each of the process flow activities, coordinates and schedules execution of the process flow activities on the resources. Bidirectional proxy components are operatively interposed between the process flow engine and the resources. The bidirectional proxy components include logic for handling application data for the resources, logic for handling worklists for access by the resources and logic for managing transport of messages between the process flow engine and each of the resources.

26 Claims, 13 Drawing Sheets

SYSTEM AND METHOD FOR PERFORMING SCALABLE DISTRIBUTION OF PROCESS FLOW ACTIVITIES IN A DISTRIBUTED WORKFLOW MANAGEMENT SYSTEM

CROSS-REFERENCE TO RELATED APPLICATION

The present application is a continuation application of provisional application No. 601032,567, filed Dec. 5, 1996, by Weimin Du et. al., and entitled WORKFLOW/PROCESS FLOW PROCESS MANAGEMENT SYSTEM, the disclosure of which is incorporated herein by reference.

This patent application is related to a commonly-assigned co-patent application entitled SYSTEM AND METHOD FOR PERFORMING FLEXIBLE WORKFLOW PROCESS EXECUTION IN A DISTRIBUTED WORKFLOW MANAGEMENT SYSTEM, Ser. No. 08/821,940, filed on the same date as the present application, the disclosure of which is incorporated herein by reference.

This patent application is also related to a commonly-assigned co-patent application entitled DISTRIBUTED WORKFLOW RESOURCE MANAGEMENT SYSTEM AND METHOD, Ser. No. 08/768,261, filed on Dec. 17, 1996, now issued as U.S. Pat. No. 5,826,239, the disclosure of which is incorporated herein by reference.

BACKGROUND OF THE INVENTION

This invention relates to the field of workflow process management and more particularly to a system and method for performing scalable distribution of process flow activities in a distributed workflow management system.

Workflow process re-engineering, that is, the fundamental rethinking and re-implementation of workflow processes to achieve never-before-possible levels of quality, cost, throughput and service, is emerging as one of the crucial business strategies of the 1990s. The need for re-engineering is especially significant in an era of workforce downsizing coupled with greater demands for shortened time to market and faster customer response. Moreover, the need is pervasive. Organizations are currently engaging in workflow process re-engineering in many domains, including financial services, telecommunications services, healthcare services, customer order fulfillment, manufacturing procedure automation and electronic commerce.

While workflow process re-engineering provides a business management concept, workflow process management (WFPM) software—or more accurately, middleware—provides the enabling technologies for actually performing workflow process re-engineering. WFPM supports flexible solutions for the management of enterprise-wide operations, including workflow process control, automation and monitoring; resource allocation, authorization and authentication; task initialization and data exchange; and end-to-end communication and security. However, while WFPM offers an overall environment and approach to unifying, automating and measuring workflow processes, it is not limited to supporting workflow process re-engineering and can be used to manage existing nonautomated legacy or work processes.

In general, WFPM systems perform a wide range of tasks. For instance, they can provide a method for defining and managing the flow of a work process or support the definition of resources and their attributes. In addition, they can assign resources to work, determine which steps will be executed next within a work process and when they will be executed and can ensure that the workflow process continues until proper termination. Moreover, they can notify resources about pending work, enforce administrative policies, such as access control and track execution and support user inquiries of status. Finally, they can provide history information in the form of an audit trail for completed workflow processes and collect statistical data for process and resource bottleneck analysis, flow optimization and automatic workload balancing.

Moreover, given the trend towards open systems and standards, a WFPM system must coexist with and take advantage of standards-based commercial products for network communication, legacy application invocation and system monitoring. In particular, these standards include the Object Management Group's Common Object Request Broker Architecture (CORBA), the Open Software Foundation's Distributed Computing Environment (OSF DCE), Hewlett Packard's OpenView and the International Standards Organization Open Systems Interconnection (ISO OSI) X.400 technologies.

In general, WFPM systems, or simply, process flow systems, effect workflow processes on a small- to large-scale basis by controlling the scheduling of and parameters used by activities, acquiring the results of the activities and using those results to determine other activities to run. Each individual business process describes the sequencing, timing, dependency, data, physical agent allocation, business rule and organization policy enforcement requirements for performing work.

Prior art process flow systems have been disclosed. However, those disclosed prior art process flow systems cannot be readily applied to large-scale applications for two reasons.

First, application-specific data, further described below in the Detailed Description, is improperly treated as process-relevant data. End activities are required to perform all data accesses directly upon the database storing the application-specific data. However, when the application-specific data is copied into the process-relevant data, the data may be independently modified by the process flow system. Such updates often damage the intended transactional semantics of the application database. Moreover, the amount of information that the process flow engine must log, process and dispatch increases.

Second, users must review and select from lists of available work by communicating directly with the process flow system. This direct interface adds work to the system that could be done by separate processes on independent resources and limits the system's size. Also, since the process flow system must deal directly with client worklist requests, potential performance is lost in dealing with user requests to see what work is available. Moreover, such user requests are often non-randomly distributed and the system must have sufficient computing capacity available to deal with these bursty requests.

Therefore, there is a need for a system and method for providing high degree of scalability to process flow systems. Preferably, such a system and method would provide an enterprise-wide process flow solution.

There is a further need for a system and method for managing a process flow system providing a bidirectional proxies for processing user work requests, handling application-specific data and effecting transport interfacing.

SUMMARY OF THE INVENTION

The present invention provides a system and method for performing scalable distribution of process flow activities in a distributed process flow management system.

An embodiment of the present invention is a system and method for performing scalable distribution of process flow activities in a distributed workflow management system. The distributed workflow management system operates over the computer network which includes a plurality of interconnected computers. Each computer includes a processor, memory and input/output facilities. A plurality of resources are each operatively coupled to at least one of the computers and execute at least one of the activities in the process flow. A process flow engine, including a database in which is stored data used in effecting each of the process flow activities, coordinates and schedules execution of the process flow activities on the resources. Bidirectional proxy components are operatively interposed between the process flow engine and the resources. The bidirectional proxy components include logic for handling application data for the resources, logic for handling worklists for access by the resources and logic for managing transport of messages between the process flow engine and each of the resources.

The foregoing and other objects, features and advantages of the invention will become more readily apparent from the following detailed description of a preferred embodiment of the invention which proceeds with reference to the accompanying drawings.

DETAILED DESCRIPTION

Workflow Process Management System

Figure 1:
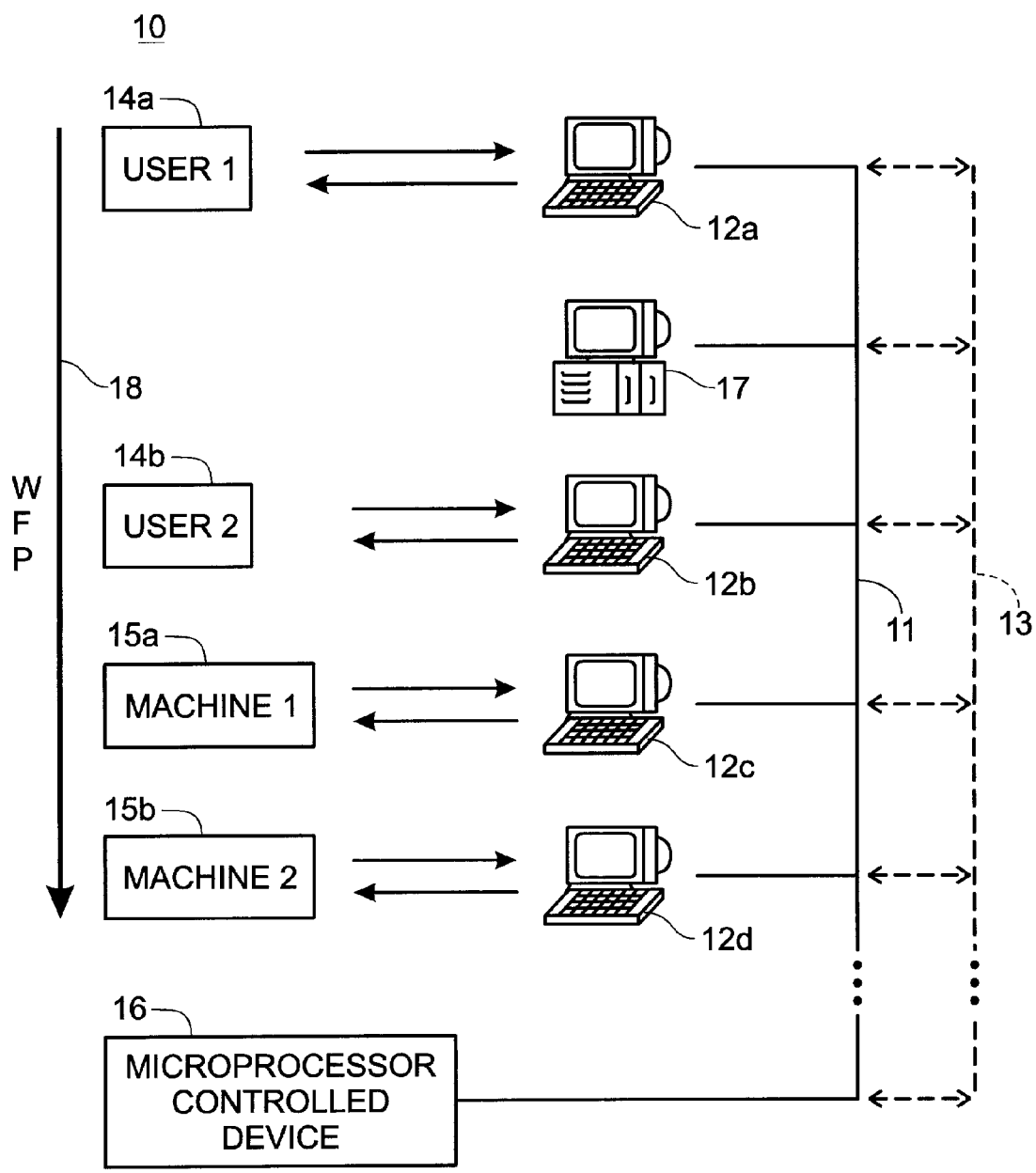
FIG. 1 is a block diagram of a process flow management system implemented in a network of computers coupled to a plurality of users and machines for management and control of workflow process activities performed by the users and machines.

FIG. 1 shows a block diagram of a workflow process management (WFPM) system 10 implemented in a network 11 of computer systems 12a–d coupled to a plurality of users 14a–b and machines 15a–b for management and control of workflow process activities. Each computer system 12a–d is shown coupled with a single user 14a–b or machine 15a–b, but multiple users or machines or combinations thereof can also be employed. The WFPM system 10 is shown from an enterprise perspective with the control and coordination of each of the computer systems 12a–d being accomplished by computer software, preferably object-oriented software, executed as a distributed application by the computer systems 12a–d. Optionally, workflow process activity information, such as resource data and rules, can be stored in a database on a centralized WFPM server 17 which is accessible by the computer systems 12a–d over the network 11 or can be stored in a plurality of databases on each of the computer systems 12a–d. The computer systems 12a–d and centralized WFPM server 17 conventionally include a processor, memory and input/output interface including network communications facilities and user input and output devices.

Each workflow process 18 includes a sequence of activities, each of which is ordinarily performed by one of the computer systems 12a–d in conjunction with an associated user 14a–b or machine 15a–b, although some activities can be performed by microprocessor-controlled devices 16 (one such device shown in FIG. 1, although multiple devices can be used), such as a telephone or facsimile machine, printing device or similar self-controlling mechanism. In addition, each machine 15a–b can be a work instrument or computer resource.

The workflow process 18 can span several business organizations (only one organization is shown in FIG. 1) with multiple activities potentially performed in parallel. In such cases, the WFPM system 10 acts as the "superstructure" that ties together disparate computer systems 12a–d whose business purposes are interconnected. The WFPM system 10 provides procedural automation 13 of the workflow process 18 by managing the sequence of process activities and the invocation of appropriate user 14a–b, machine 15a–b or microprocessor-controlled device 16 resources associated with the various activity steps.

Workflow Process Specification

The procedural automation 13 of the workflow process 18 involves the high-level specification of individual workflows (examples shown in FIG. 3 and FIG. 7) which provides the operational "glue" and environment support needed by the WFPM system 10 for managing and automating the workflow processes 18, recovering from failures and enforcing consistency. As further described hereinbelow, the WFPM system 10 also enforces various administrative policies associated with resources and work.

The specific structure and flow of each workflow process 18 managed by the WFPM system 10 can be preplanned or developed in an ad hoc fashion. For example, in a WFPM system 10 used for managing the workflow process 18 of providing telecommunications services, some aspects of the workflow process 18 are determined ad hoc and depend in part on the services required by each individual customer. However, other aspects of the workflow process 18 can be preplanned and deliberately structured. For instance, independent from the individual services required by a single customer, the workflow process 18 always originates in the sales department and typically ends in the billing department. The parts of the workflow process 18 involving these departments can be preplanned.

HP OpenPM

Figure 2:
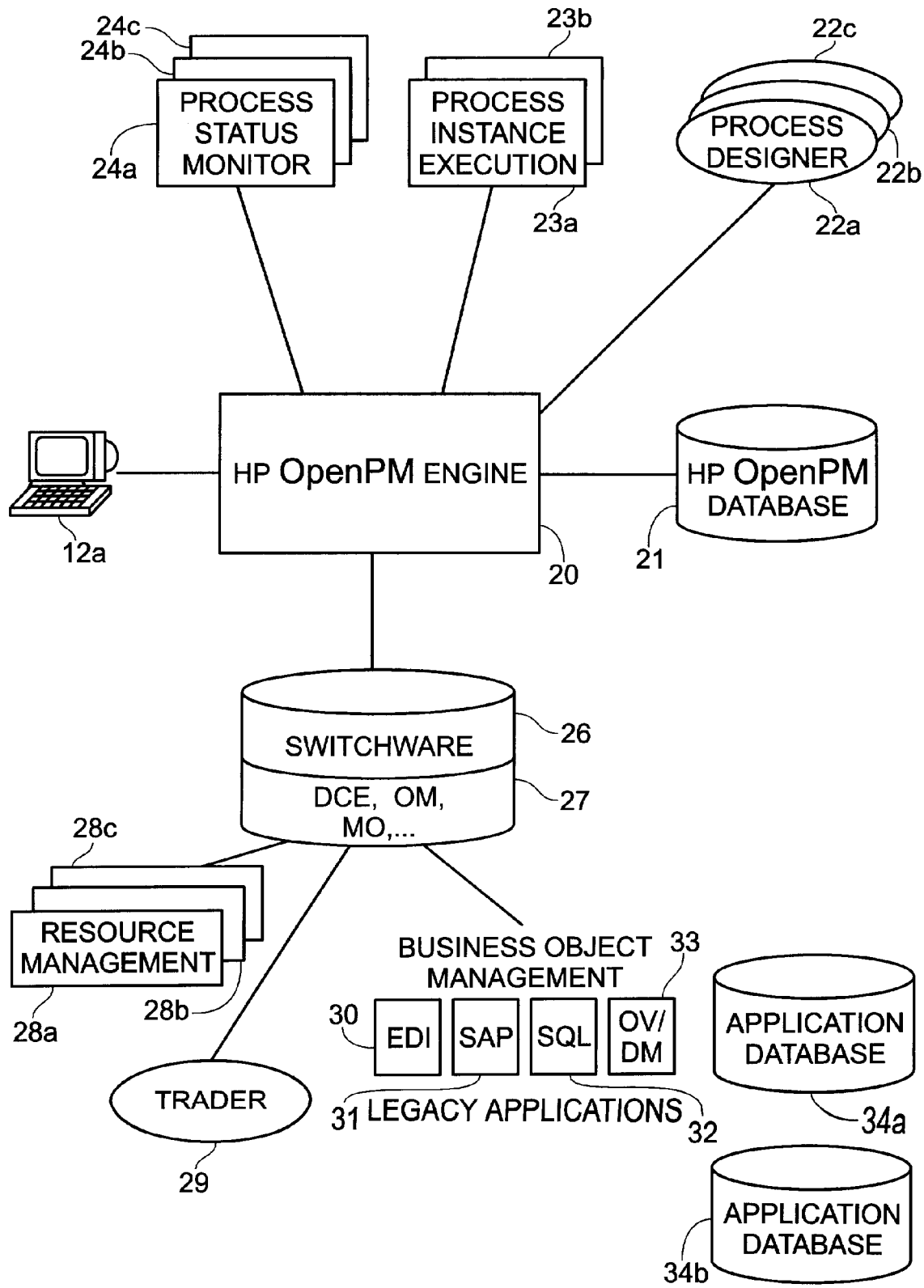
FIG. 2 is a block diagram of a hardware and software machine for a typical node in the network of FIG. 1 showing the architecture of an example of process flow management middleware employing the present invention.

FIG. 2 is a block diagram of a hardware and software machine for a typical node 12a in the network 11 of FIG. 1 showing, by way of example, an architecture for WPFM middleware employing the present invention. An example of middleware suitable for implementing the present invention is the Hewlett Packard (HP) OpenPM system. HP OpenPM is an open, enterprise-capable, object-oriented WFPM system developed at Hewlett Packard Laboratories, Palo Alto, Calif. for managing process activities that support complex enterprise processes in a distributed, heterogeneous computing environment. The use of a WFPM system 10 implemented in middleware represents a substantial evolution over traditional workflow technologies. HP OpenPM provides a generic framework and complete set of services for workflow process management using a middleware-based approach with an emphasis on performance, availability, scalability and system robustness.

Briefly, HP OpenPM provides an open system adhering to the CORBA communications infrastructure with a Workflow Management Coalition-standard interface. Second, it offers high performance as a result of optimized database access and commitment features. It also provides effective management when coupled with an HP OpenView-based system management environment. Finally, HP OpenPM presents a comprehensive solution for business re-engineering, including an extensive set of products.

The overall architecture of the HP OpenPM system is depicted in FIG. 2. The core is the HP OpenPM engine 20, which supports five interfaces. The interfaces enable the HP OpenPM engine 20 to interact with workflow process designer 22A–C, workflow process instance execution 23a–b, workflow process monitor 24A–C, workflow management 28A–C and business object management modules 30, 31, 32, 33. In addition, worldwide web client support is provided by each individual network node 12a which can execute middleware modules expressed in platform-independent languages, such as Java Applets and HTML code. An HP OpenPM database 21 is maintained on the centralized WFPM server 17 (shown in FIG. 1) for use by the HP OpenPM engine 20.

A workflow process 18 is specified by the process design modules 22A–C via the workflow process definition interface. An instance of a workflow process 18 can be started, controlled or stopped by the process instance execution modules 23a–b via the process execution interface. Status information of each process instance and load information for the WFPM system 10 can be queried using the process status monitor modules 24A–C via the process status monitoring interface. The workflow management interface is used to allocate, at run time, execution resources to a task, according to the policies defined by the organization (including authorization and authentication) and the availability of the resources using the workflow management modules 28A–C. Interaction with the external world, such as invoking an application, controlling an instrument or delivering a work order to a person's electronic mail in-box, is performed by the various business object management modules 30, 31, 32, 33.

HP OpenPM Process Model

Figure 3:
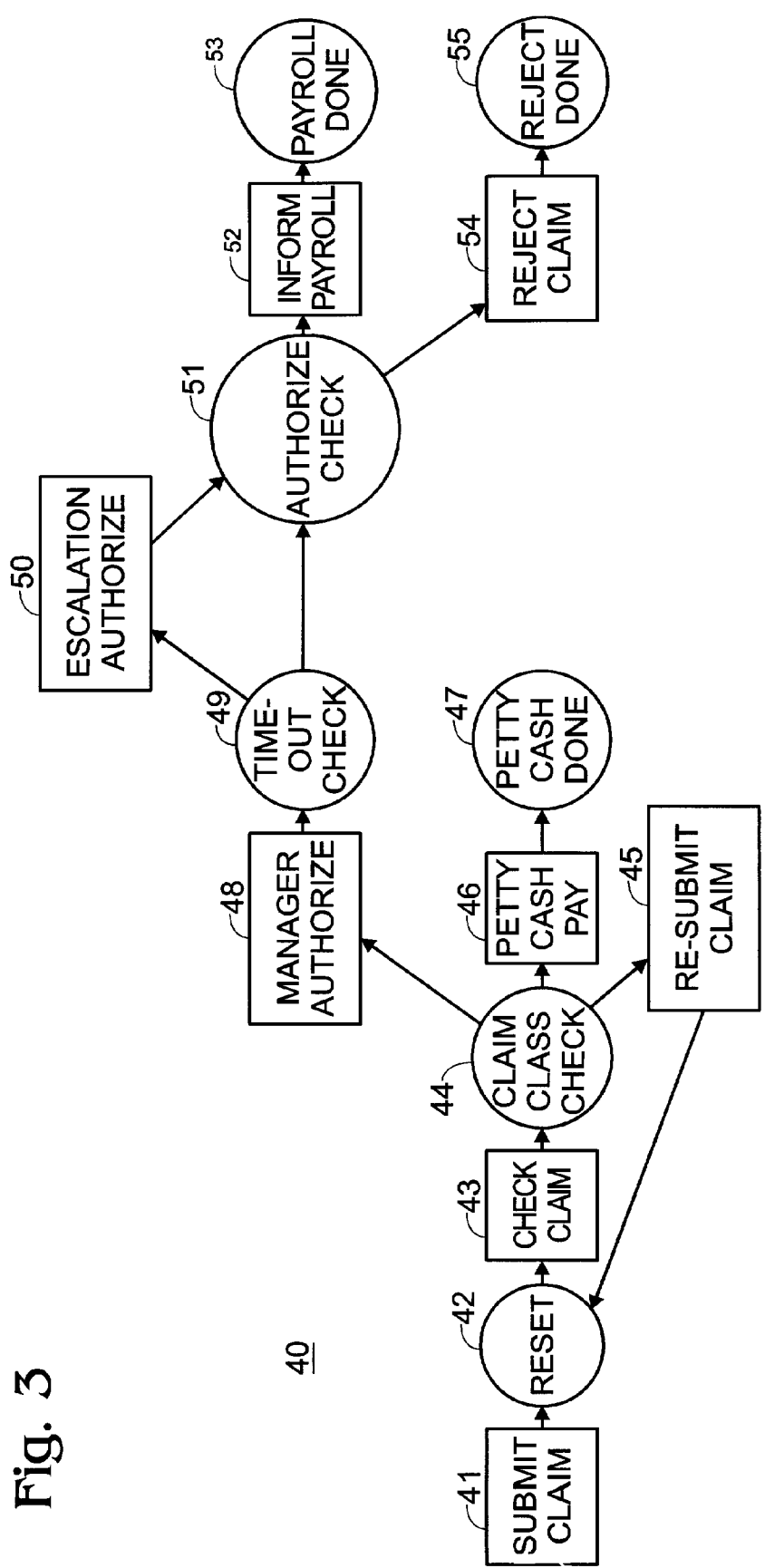
FIG. 3 is a computer display of the user interface for the user of the machine of FIG. 2 to interact with the process flow management system, the display showing an example of a process flow diagram for a business process flow managed by the system.

In general, a workflow process 18 is a description of the sequencing, timing, dependency, data, physical agent allocation, business rule and organization policy enforcement requirements of process activities needed to enact work. FIG. 3 shows, by way of example, a workflow process 18 which is represented as a directed graph 40 consisting of a set of nodes connected by arcs as displayed on the HP OpenPM user interface.

There are two kinds of nodes: work nodes 41, 43, 45, 46, 48, 50, 52, 54, which are shown as squares, and rule nodes 42, 44, 47, 49, 51, 53, 55, which are shown as circles. There are also two kinds of arcs, forward arcs and reset arcs. A work node has at most one inward arc and one or more outward arcs. A rule node can have any number of inward and outward arcs.

Forward arcs represent the normal execution flow of process activities and form a directed acyclic graph 40. Successful completion of a node at the source end of a forward arc triggers the starting of the node at the destination end of the forward arc.

Reset arcs are used to support repetitions or explore alternatives in a workflow process 18. Reset arcs differ from forward arcs in that they reach backwards in the process graph.

Work nodes 41, 43, 45, 46, 48, 50, 52, 54 represent activities to be performed external to the HP OpenPM engine 20. These activities include authorization, resource allocation, execution of business objects 93A–C and provision of input data for the business objects 93A–C and output data from them. Rule nodes 42, 44, 47, 49, 51, 53, 55 represent processing internal to the HP OpenPM engine 20. This processing includes decisions of about which nodes should execute next, generation or reception of events, and simple data manipulation.

A work node 41 is a placeholder for a process activity, which is a logical representation of a piece of work contributing towards the accomplishment of a process 18. A process activity is mapped to the invocation of an operation on business objects 93A–C during the execution of the process and each process activity can represent a manual operation by a human or a computerizable task to execute legacy applications 30, 31, 32, 33 (shown in FIG. 2), access application databases 34a, 34b (also shown in FIG. 2), control instrumentation, sense events in the external world or effect physical changes. A process activity definition includes a forward activity and optionally, a compensation activity, a cancel activity, a workflow management activity, timeout and deadline information and input and output data.

Rule nodes 42, 44, 47, 49, 51, 53, 55 are used to specify workflow processes 18 that are more complex than a simple sequence. A rule language is used to program the rule node decision. When executed, a rule node 42 determines which outward arcs to fire based on the status passed along the inward arcs, the time at which each inward arc is fired and process-relevant data associated with the process instance.

Rule nodes 42, 44, 47, 49, 51, 53, 55 are also used to support events. A rule node 42 can raise events when certain conditions are met as defined by the rules and an event can activate rule nodes that have subscribed to receive the event.

Rule nodes 42, 44, 47, 49, 51, 53, 55 are executed each time any inward arc fires. Work nodes 41, 43, 45, 46, 48, 50, 52, 54 have states of initial or fired. When the inward arc is fired on a work node 41 in the initial state, the work node 41 changes its state to fired and performs or requests its associated activity. When the inward arc is fired on a work node 41 in the fired state, nothing is done.

A reset arc, for example, between nodes 42–45, together with the forward arcs between its destination and source, forms a loop. When traversed, a reset arc causes all nodes 42–45 within its loop to be reset. Resetting a fired work node 43 changes its state to initial so that the node 43 can be re-executed. Resetting an active work node 43 cancels the current execution of the corresponding process activity and changes its state to initial.

Associated with each workflow process 18, there is a process data template defined by a workflow process designer module 22a (shown in FIG. 2). The process data template is used to provide initial data for the creation of process instances. At run time, based on the process data template and read/write lists of activities defined in a workflow process 18, HP OpenPM will generate a case packet for each process instance to facilitate data passing between activities and the HP OpenPM engine 20.

HP OpenPM Process Execution

Figure 4:
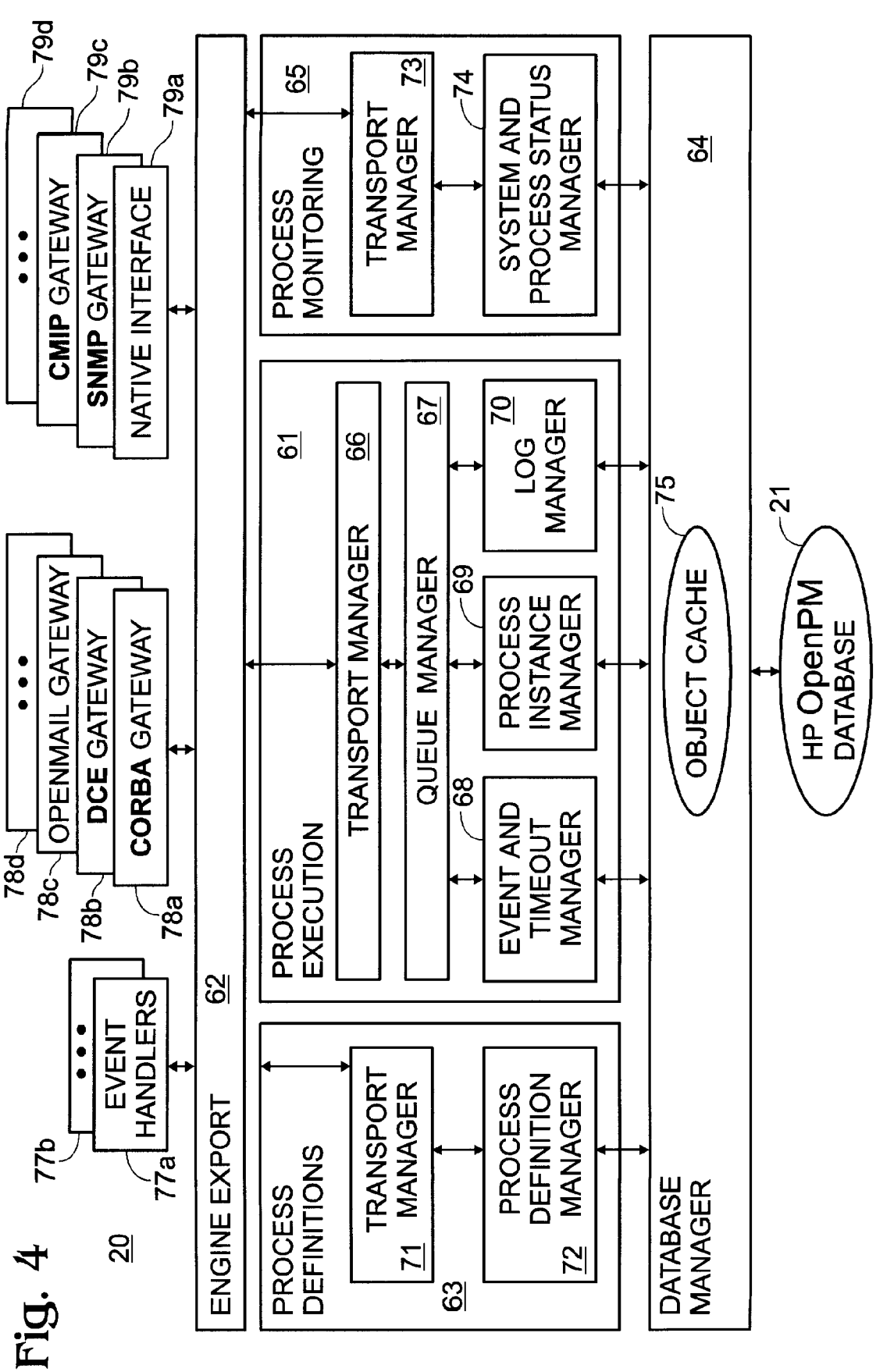
FIG. 4 is a block diagram of the preferred form of workflow process software engine that coordinates execution flow of the managed process.

FIG. 4 is a block diagram of the preferred form of a workflow process software engine, such as the HP Open PM engine 20, that coordinates execution flow of the workflow processes 18. The HP OpenPM engine 20 functions as a highly reliable, log-based state machine which interfaces with external environments through a uniform CORBA-based transport interface, independent of the actual physical dispatch of the requests.

The HP OpenPM engine 20 launches workflow process instances in response to user requests. For each instance, the HP OpenPM engine 20 steps through the nodes in the directed graph 40 (examples shown in FIG. 3 and FIG. 7) according to the order specified in its workflow process definition. For work nodes, the HP OpenPM engine 20 executes the associated process (forward) activity. For rule nodes, the HP OpenPM engine 20 evaluates the rules and performs the rule actions when the rule conditions are met.

Each node transition is durably logged to facilitate forward rolling of incomplete workflow processes 18 at system restart time in the event of a system failure or to facilitate a support activity compensation process in the case of a process activity failure. In addition, the HP OpenPM engine 20 allows flexible specification of compensation scopes and actions, such as compensation activity or cancel activity, to support various application needs.

In the HP OpenPM engine 20, different versions of similar workflow processes 18 are supported by the engine 20 under the concept of a process group. A user can designate a particular version as the default version to be used when no specific version is requested at the time a workflow process instance is created.

To monitor the progress of running process activities and support system management, the HP OpenPM engine 20 maintains a comprehensive log of all events using a log manager 70 and provides a native interface 79a as well as an SNMP 79b and CMIP 79c gateways to facilitate integration with the HP OpenView environment. The formats and contents of the logged information can be customized to support specific application needs.

HP OpenPM Workflow Objects

The HP OpenPM engine 20 has to interact with process activities supported by various implementations encountered in real life. These activities can range from manual handling by users 14a–b to automated processes executed by computers 15a–b. An infrastructure is needed to enable the effective management and invocation of these process activities.

Distributed object technologies have become the primary infrastructure for enterprise-scale distributed computing. Among them, the OMG (Object Management Group) CORBA (Common Object Request Broker Architecture) technology has been developed to support interoperability for application integration.

Based on CORBA technology, in the HP OpenPM engine 20, an abstraction called a business object 93A (shown in FIG. 5) is built to encapsulate whatever piece of work each process activity has to accomplish. The wrapping code provides an IDL (Interface Definition Language) interface. The business objects are catalogued by a database manager 64 in the HP OpenPM business object library in business databases 94A–C (shown in FIG. 5). An object cache 75 is optionally used to optimize business object access.

A business object 93A, as defined by the OMG, is a representation of something active in the business domain, including its business name and definition, attributes, behavior and constraints. It provides a uniform way to encapsulate legacy systems and applications and a direct mapping, in understandable business terms, between the business model and the possibly sophisticated operational procedures of the workflow process system.

By representing these process activities in business objects 93A–C, new workflow processes 18 can be quickly created by assembling business objects 93A–C to describe workflow processes 18. The business object library avoids repetitive coding to tailor the process activity implementation to each individual workflow process 18.

HP OpenPM Resource and Policy Management

A resource is a person, computer process or machine that can be used to accomplish a task. A resource has a name and various attributes defining its characteristics, such as job code, skill set, organization unit and availability.

A policy is a set of rules that determines how resources are related to tasks within a WFPM system 10. One common use is for task assignment. Policies can be used to specify which resource, under which role, is eligible or available to perform a task. Policies are also used to ensure proper authorization and authentication.

In HP OpenPM, the mapping between the process activity (task) specified in a workflow process 18 and the business object (resource) to be invoked is performed by the resource manager 28a (shown in FIG. 2) during run time as part of the execution of the process activity. The HP OpenPM engine 20 allows multiple resource managers 28A–C to be used to resolve a single resource assignment request; each resolves the request at a different level within an organization.

HP OpenPM Worklist and Application Data Handlers

Figure 5:
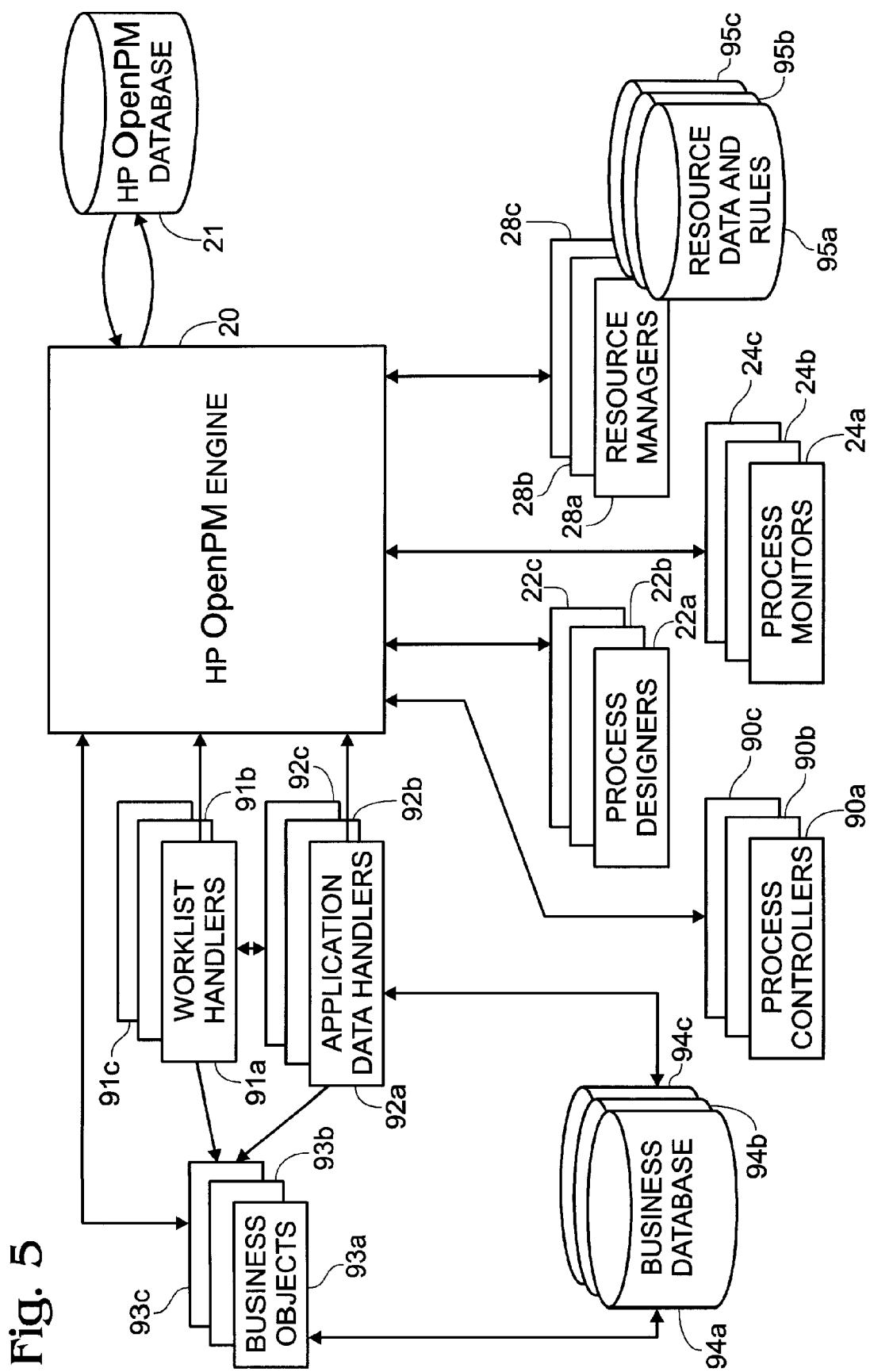
FIG. 5 is a block diagram of the system architecture with optional worklist handler and application data handler features to enhance scalability.

FIG. 5 is a block diagram of the system architecture of FIG. 2 with optional features to enhance scalability of HP OpenPM systems. Two optional components that can be added into the HP OpenPM engine 20 environment to facilitate the execution of workflow processes 18 are worklist handlers 91A–C and application data handlers 92A–C.

The worklist handler 91A supports both engine-push and client-pull modes to provide more freedom in task assignment. In addition, the worklist handler 91A can be used to support the concept of integration on demand. Based on the task performer's profile, the worklist handler 91A determines and launches a specific environment for an activity at run time, rather than hard-wiring it into the process definitions.

The application data handler 92A supports the separation of application-specific data and process-relevant data to reduce the amount of data flow over the network. It also provides the preparation facility for application-specific data to remove the burden of database access from activity performers.

HP OpenPM Security

In today's business environments, security must be implemented enterprise-wide. The security service developed by the OMG provides authentication and encryption for the HP OpenPM engine 20 to prevent eavesdropping and forgery. The HP OpenPM engine 20 infrastructure components can identify each other and vouch for the credentials of end-user components.

WFPM in the Telecommunications Management Network

Figure 6:
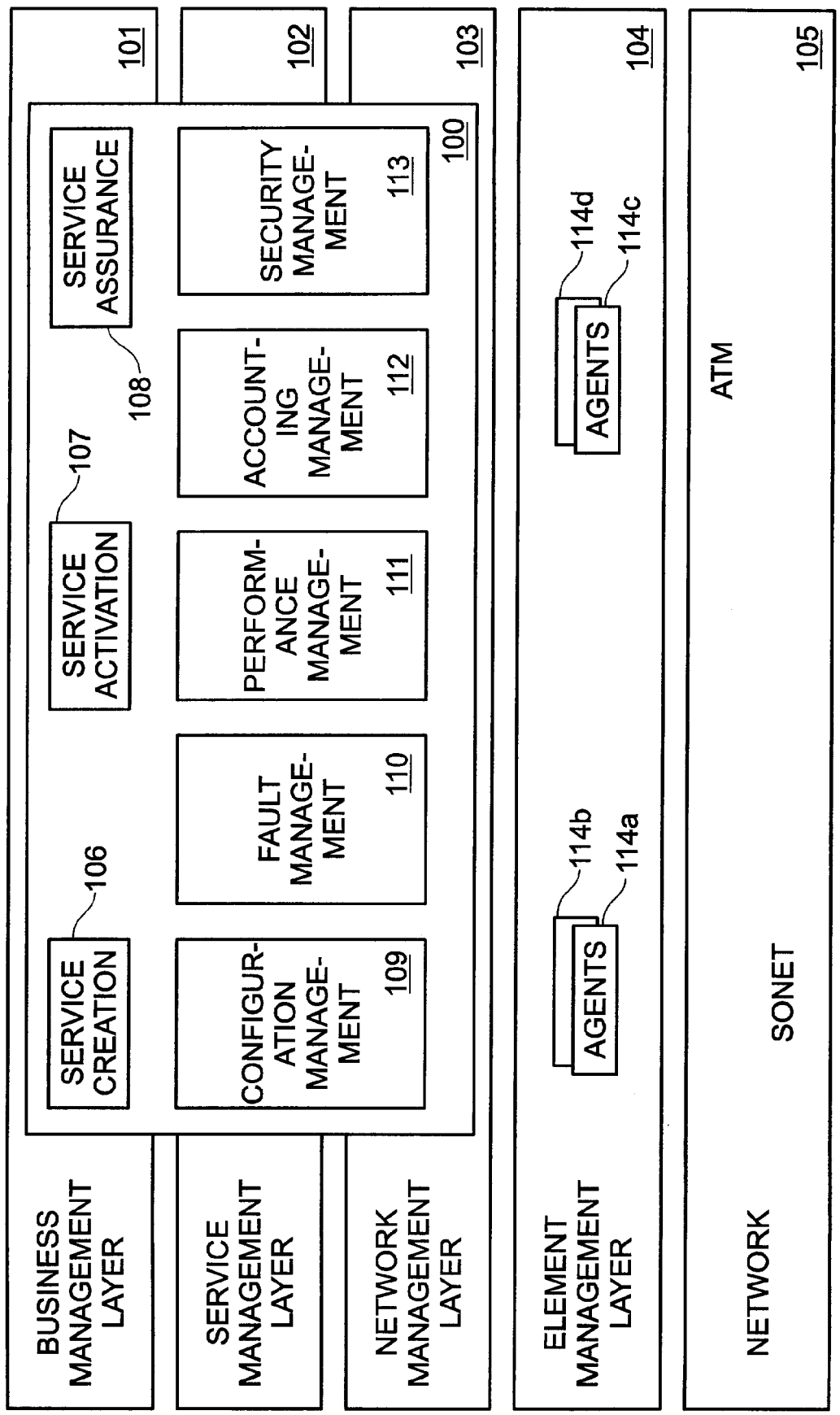
FIG. 6 is a diagram showing management function layers provided by business process flow management using the system of FIGS. 1–5 for the example of management of a telecommunications network.

FIG. 6 is a diagram showing management function layers 101, 102, 103, 104, 105 provided by workflow process management using the system of FIGS. 1–5 for an example of the management of a telecommunications network. The Telecommunications Management Network (TMN) defined by the International Telecommunications Union is changing the way operations support systems and business support systems solutions are being developed. The TMN architecture separates layers of functionality and provides access by elements in any one layer to any element in the layer immediately below, as shown in FIG. 6. Before the introduction of the TMN model, operations support systems and business support systems solutions were isolated from each other and could not interoperate.

The HP OpenView Distributed Management platform supports the realization of TMN operations support systems and business support systems solutions for the TMN element management layer 104 and network management layer 103. However, a middleware service is needed for supporting the service management layer 102 and even the business management layer 101 of the TMN model. The next section presents an example of this support.

At the service management layer 102, the WFPM process enabling framework is required to be able to support re-engineering and transformation processes for strategic operations support systems and business support systems, to integrate existing operational environments to form an enterprise hub for service management and provisioning, deploy new management services as rapidly as possible, to monitor and measure processes, to tune processes to benefit from experience and to automate processes to reduce execution time.

SONET Configuration Management Prototype

Figure 7:
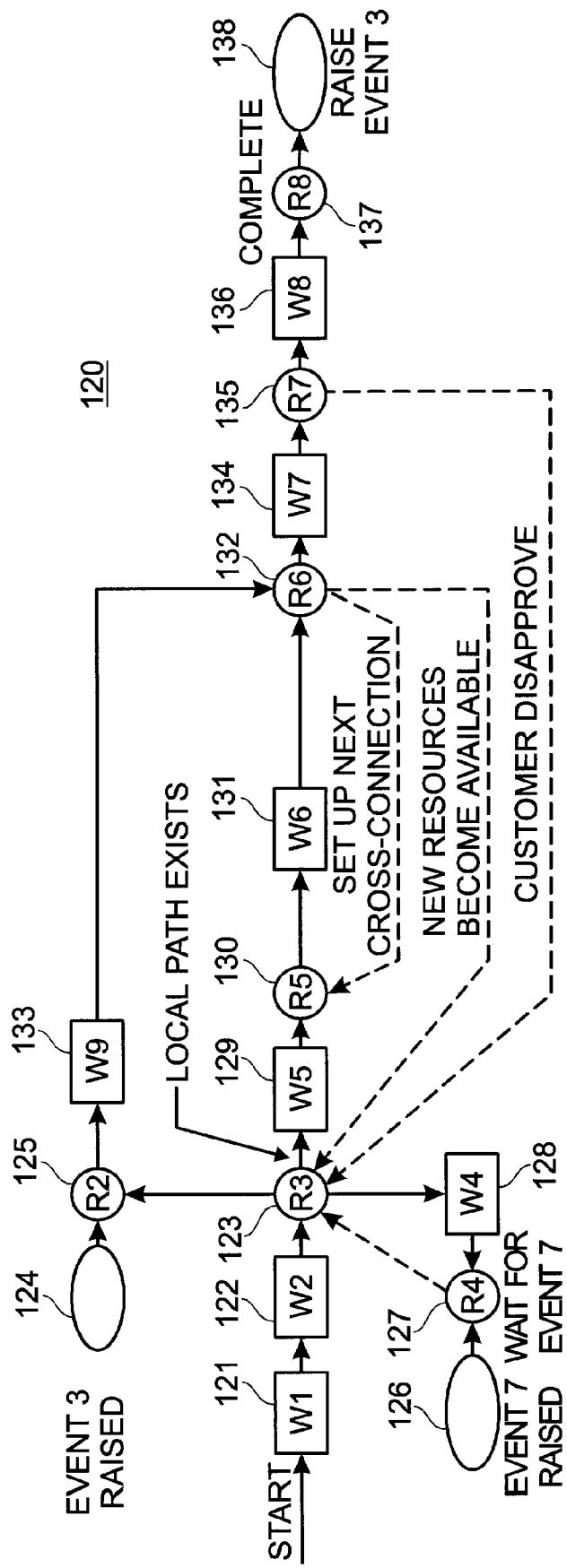
FIG. 7 is a process definition diagram for configuration management of the telecommunications network in the example of FIG. 6.

FIG. 7 is a process definition diagram for configuration management of the telecommunications network in the example of FIG. 6 based on the HP OpenPM system. It depicts a prototype to demonstrate the application of WFPM technology in the specific domain of SONET (Synchronous Optical Network) configuration management. The prototype was a joint project between HP Laboratories in Bristol, England and Palo Alto, Calif. to demonstrate the middleware technologies required to automate the processes supporting the configuration management of a SONET telecommunications network.

The scenario demonstrated by this prototype consists of the provision of a new VC4/VC12 path for customers. It goes through several different steps for this operation: search for a new route, negotiate the service level agreement (SLA) with the customer, configure the new path, and finally, update the SLA for this customer. The HP OpenPM process definition supporting the process of providing this new SONET data path is sketched in FIG. 7 which shows the HP OpenView process definition for SONET configuration management.

Searching for and configuring a new path in SONET are complex processes requiring a lot of interaction with the SONET MIB (Management Information Base) and network elements. This type of operation is a source of errors when it is performed manually by an operator as a set of individual, uncorrelated activities.

In the prototype, such complex operations as searching and configuring new paths are handled as workflow processes 18 and automated by an HP OpenPM engine 20 in an environment interacting with HP OpenView DM and Oracle DBMS applications.

Depending upon the changing business needs, a customer can request to add or drop communication paths between certain endpoints in a private virtual network (PVN). In HP OpenPM, these services can be modeled as workflow processes 18 to be executed by the service provider. Adding a new path may consist of the following activities and decision points:

1. Retrieve the customer's profile from the customer database for customer-PVN-specific information.

2. Locate the closest add-drop multiplexers (ADMs) to the endpoints, based on the information stored in the SONET physical configuration database.

3. Check whether fiber connections exist between the endpoints and the two end-ADMs.

4. If not, issue a request for an engineer to go on-site and physically connect the endpoints to the end-ADMs. After the establishment of the connection, the process continues on to step 5 and an independent subprocess is initiated to watch for resource changes.

5. Find valid routes between end-ADMs. This requires access to the routing table in the SLA database to determine whether any valid routes exist between the two end-ADMs. Either a list of ADMs is returned signifying the ADMs that must be configured to realize the route, or "No Route Found" is returned. For a returned list of ADMs, this activity will then use the HP OpenView DM facility agent to collect port information stored in the MIB to determine the available ports between the ADMs that are fibered together and can be used to enable the path.

6. Check network element (NE) capabilities. For an ADM in the route, this activity uses the HP OpenView DM NE agent to access the MIB information to determine whether a VC4 cross-connection can be set up in the ADM between the selected ports of the ADM. This activity has to be executed for each ADM in the route. During steps 5 and 6, if any additional resources become available, HP OpenPM cancels any currently running activity and starts the process over from step 5 to consider these newly available resources.

7. Get customer's approval of the selected configuration. Once a suitable path is identified, the customer will review the offer, including available date, charges, quality of services (QoS), and so on. Depending upon the business factors (such as, cheapest service wanted), the customer may request that a new search be initiated, that is, loop back to step 5 to find another valid route.

8. Configure the selected route. This activity is responsible for setting up the cross-connections in each ADM by invoking the HP OpenView DM NE agent and updating the SLA database.

Scalable Distribution of Process Flow Activities

Figure 8:
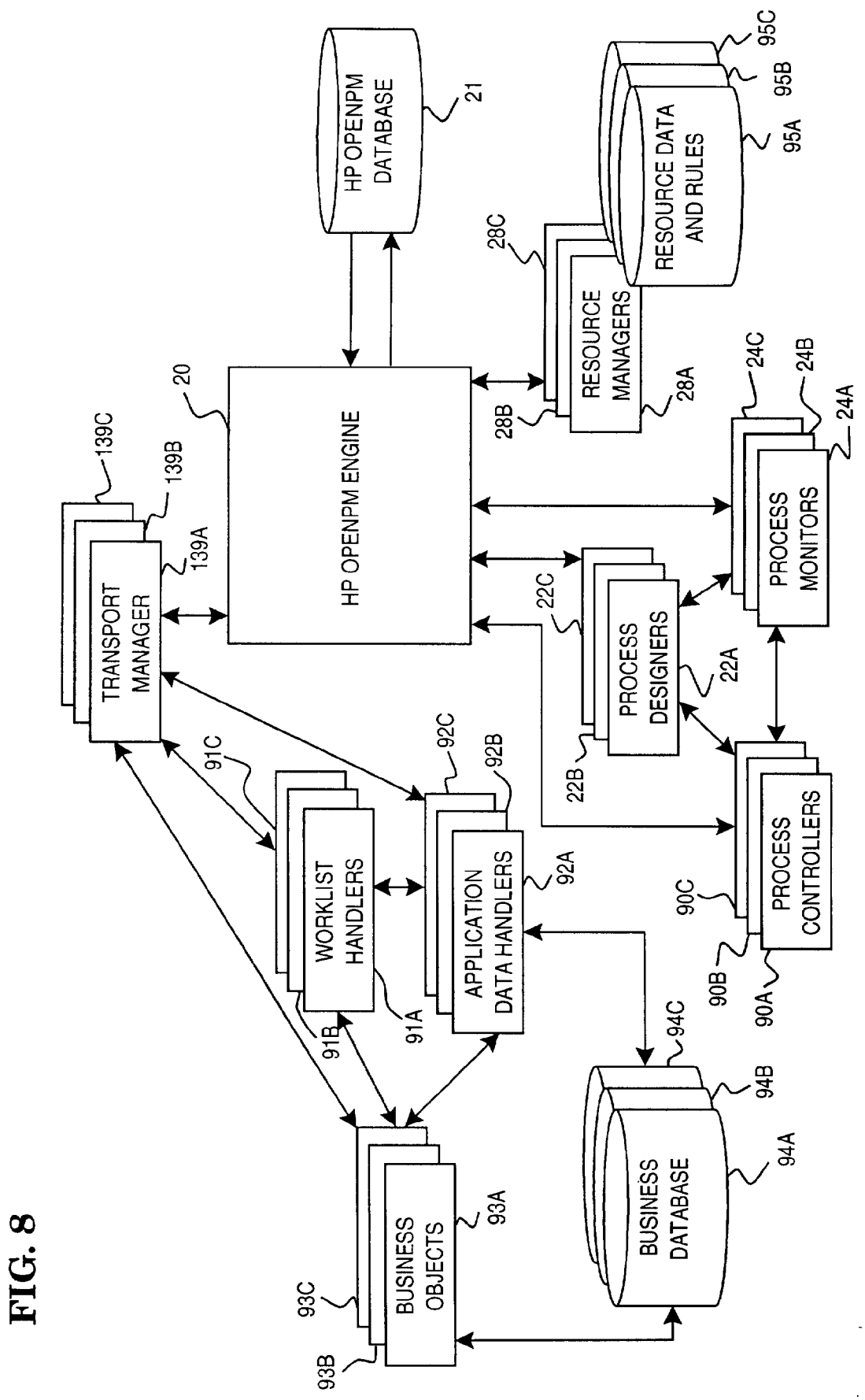
FIG. 8 is a block diagram of the system architecture of FIG. 5, including bidirectional proxy components according to the present invention.

FIG. 8 is a block diagram of the system architecture of FIG. 5, including bidirectional proxy components 91A–C, 92A–C, 139A–C, according to the present invention. The core of the system architecture is the OpenPM engine 20 which supports five interfaces for workflow process 18 defining using the process designers 22A–C, workflow process 18 execution using the process controllers 90A–C, workflow process 18 monitoring using the process monitors 24A–C, resource and policy management using the resource managers 28A–C, and business object management using the business objects 93A–C.

As shown in FIG. 3, each workflow process 18 is defined by a directed graph 40 comprising a set of nodes connected by arcs. There are two kinds of nodes: work nodes 41 (shown as squares) and rule nodes 42 (shown as circles). Rule nodes 42 represent computations and decisions internal to the OpenPM engine 20. Work nodes 41 represent the execution of an activity external to the OpenPM engine 20.

There are two kinds of arcs: forward arcs and reset arcs. The forward arcs, such as the arc between work node 41 and rule node 42, combined with the nodes form an acyclic connected graph. Each reset arc, such as the arc between work node 45 and rule node 42, forms a cycle in the directed graph 40. Each work node 41 has exactly one inward and one outward arc. Each rule node 42 has at least one inward arc and zero or more outward arcs. There are one or more start arcs at which the workflow process 18 begins execution; each start arc has a destination node but no source node.

Each work node 41 represents activities to be performed external to the OpenPM engine 20, such as submitting a claim. These activities include authorization, resource allocation, execution of business objects 93A–C (shown in FIG. 8) and the provision of input data for and output data from the business objects 93A–C. Each rule node 42 represents processing internal to the OpenPM engine 20. This processing includes determining the next nodes to execute, the generation and reception of events and simple data manipulation.

Each work node 41 is a placeholder for a process activity which logical represents of a work unit contributing toward the accomplishment of the workflow process 18. During the execution of the workflow process 18, a process activity is mapped to the invocation of an operation on a business object 93A, also referred to as a "resource." In turn, each business object 93A can represent a manual operation by a human or a computerizable task to execute legacy applications, access databases, control instrumentation, sense events in the external world or affect physical changes.

Each rule node 42 is used to specify process flows that are more complex than a simple sequence, such as authorizing a check in rule node 51. A rule language is used to program the rule node 42 decision. When executed, the rule node 42 determines which outward arc(s) to fire, based on the status passed along the inward arcs, the time at which each inward arcs was fired and the process-relevant data associated with the process instance.

Rule nodes 42 are also used to support events. A rule node 42 can raise events when certain conditions are met, as defined by rules, and an event can activate those rule nodes 42 that have subscribed to the event. Forward arcs through the directed graph 40 represent the normal execution flow of process activities. Successful completion of a node at the source end of a forward arc triggers the starting of the node at the destination end of the forward arc.

Reset arcs are used to support repetitions or explore alternatives in a workflow process 18. Reset arcs, unlike forward arcs, reach backwards in the directed graph 40. A reset arc, together with the forward arcs between its destination and source nodes, forms a loop. When traversed, the reset arc causes all nodes within the loop to be reset. Resetting a completed work node 41 changes its state back to the initial state so the work node 41 can be re-executed. Resetting an active work node 41 cancels the current execution of the corresponding process activity and change its state back to the initial state.

A process data template, defined by a process designer 22a, is associated with each workflow process 18. The process data template provides initial data for the creation of process instances. Based on the process data template and read/write lists of activities defined in a workflow process 18, the OpenPM engine 20 will generate at runtime a case packet comprising a message for each process instance to facilitate the data passing between the activities and the OpenPM engine 20.

The directed graph 40 is used to control the execution of the workflow process 18. Arcs fire and that nodes are executed or fired off. A rule node 42 is executed each time an inward arc fires. Work nodes 41 have states of initial or fired. When the inward arc is fired on a work node 41 in the initial state, the work node 41 changes to a fired state and runs its associated activity. When the inward arc is fired on a work node 41 in the fired state, no operation is performed.

When fired, a reset arc changes the state of all work nodes 41 in its scope back to their initial states. The scope of each reset arc includes all nodes reachable by forward arcs from the reset arc's destination node and from which the reset arc's source node is reachable.

Three types of data are used by the OpenPM engine 20 to execute workflow processes. Process-specific data (PSData) is data used in effecting a workflow process 18 independent of the individual activities making up the workflow process 18. Application-specific data (ASData) is data used in effecting a workflow process 18 upon which one or more of the activities are dependent but is independent of the scheduling and controlling of the activities. Process-relevant data (PRData) is data used in effecting a workflow process 18 upon which both one or more of the activities and the scheduling and controlling of the activities are dependent.

At runtime, the OpenPM engine 20 sends a resource management request to the appropriate resource manager 28a whenever a work node 41 is to be executed. The resource manager 28a responds by returning an address list (not shown) containing business objects 93A–C, application data handlers 92A–C and worklist handlers 91A–C to be used to effect the work. Business objects 93A–C perform the business task that the work node 41 represents. Application data handlers 92A–C provide ASData to business objects 93A–C and store updates of the ASData at the conclusion of each business object's 93A–C execution. Worklist handlers 91A–C queue up work and allow users to choose from available work.

In response to the resource manager 28a, the OpenPM engine 20 creates a message containing the PRData for setting the following:

(1) a destination address list containing the address list received from the resource manager 28a;

(2) a source address list containing the address of the OpenPM engine 20; and (3) a message dispatched to the first address on the destination address list.

Each business object 93A, application data handler 92A and worklist handler 91A performs its respective portion of the work, removes itself from the destination address list, insets an appropriate address for itself on the source address list and re-dispatches the message to the new first address on the destination address list.

Bidirectional Proxy Components

Referring back to FIG. 8, the OpenPM engine 20 is augmented with bidirectional proxy components 91A–C, 92A–C, 139A–C which each appear to behave as the OpenPM engine 20 to downstream components while appearing to behave as business objects 93A–C to upstream components. A "downstream" component includes business objects 93A–C while an "upstream" component includes the OpenPM engine 20 itself. Three types of bidirectional proxy components 91A–C, 92A–C, 139A–C are employed: transport managers 139A–C, application data handlers 92A–C and worklist handlers 91A–C.

The bidirectional proxy components 91A–C, 92A–C, 139A–C facilitate the efficient dispatch of work. When the OpenPM engine is preparing to dispatch a unit of work, a request is sent to a resource manager 28a to map the activities associated with the work unit into a description of the steps. In response, the resource manager 28a returns a list of addresses, as described above, for nodes in the directed graph 40 through which the work unit should be routed. This allows the resource manager 28a to string together a list of the bidirectional proxy components 91A–C, 92A–C, 139A–C ending with one of the business objects 93A–C. Each element in the address list generated by the resource manager 28a is either an address, such as a CORBA (Common Object Request Broker Architecture reference); a query, such as an ORB trader query); or a claim.

Each unit of work is represented by a message comprising a source address list, a destination address list and a value list. The OpenPM engine 20 and each bidirectional proxy component 91A, 92A, 139a process the message, add an address or query for themselves to the source address list, remove the first element from the destination address list and route the message to that destination. If the message is a query, the ORB Trader 29 (shown in FIG. 2) is consulted to determine an actual address for the message. If the message is a claim, the current bidirectional proxy component 91A, 92A, 139a must be a worklist handler 91A and the message is then queued until a client presents the appropriate claim.

The bidirectional proxy components 91A–C, 92A–C, 139A–C will now be discussed.

Application Data Handlers

Referring back to FIG. 8, the application data handlers 92A–C perform three main functions: (1) augmenting the PRData with ASData prior to the execution of each business object 93A–C; (2) storing any changes back to the ASData; and (3) optionally providing transactional semantics spanning multiple activities. By augmenting the PRData with ASData, the application data handlers 92A–C can provide data to the business objects 93A–C as if the data were process-relevant data without incurring the transportation and processing overhead attendant to exchanging strictly PRData. Thus, the ASData remains resident in the OpenPM database 21 without a copy being stored in at least one of the business databases 94A–C. This approach also isolates the process flow system from anomalies that can be caused by concurrent modification of the ASData by multiple business objects 93A–C. Moreover, the appropriate transactional semantics can be tailored to the specific needs of the data and the individual business objects 93A–C need not implement the code for obtaining data from the OpenPM database 21 as if it were PRData.

At least one element from the value list associated with each unit of work contains a description, such as program code and the like, describing the transformation of the value list that a recipient application data handler 92A is expected to perform at runtime. Optionally, the value list also contains a transformation to be performed as the message is routed back to the OpenPM engine 20 on the return path, typically after the unit of work has been completed.

Figure 9:
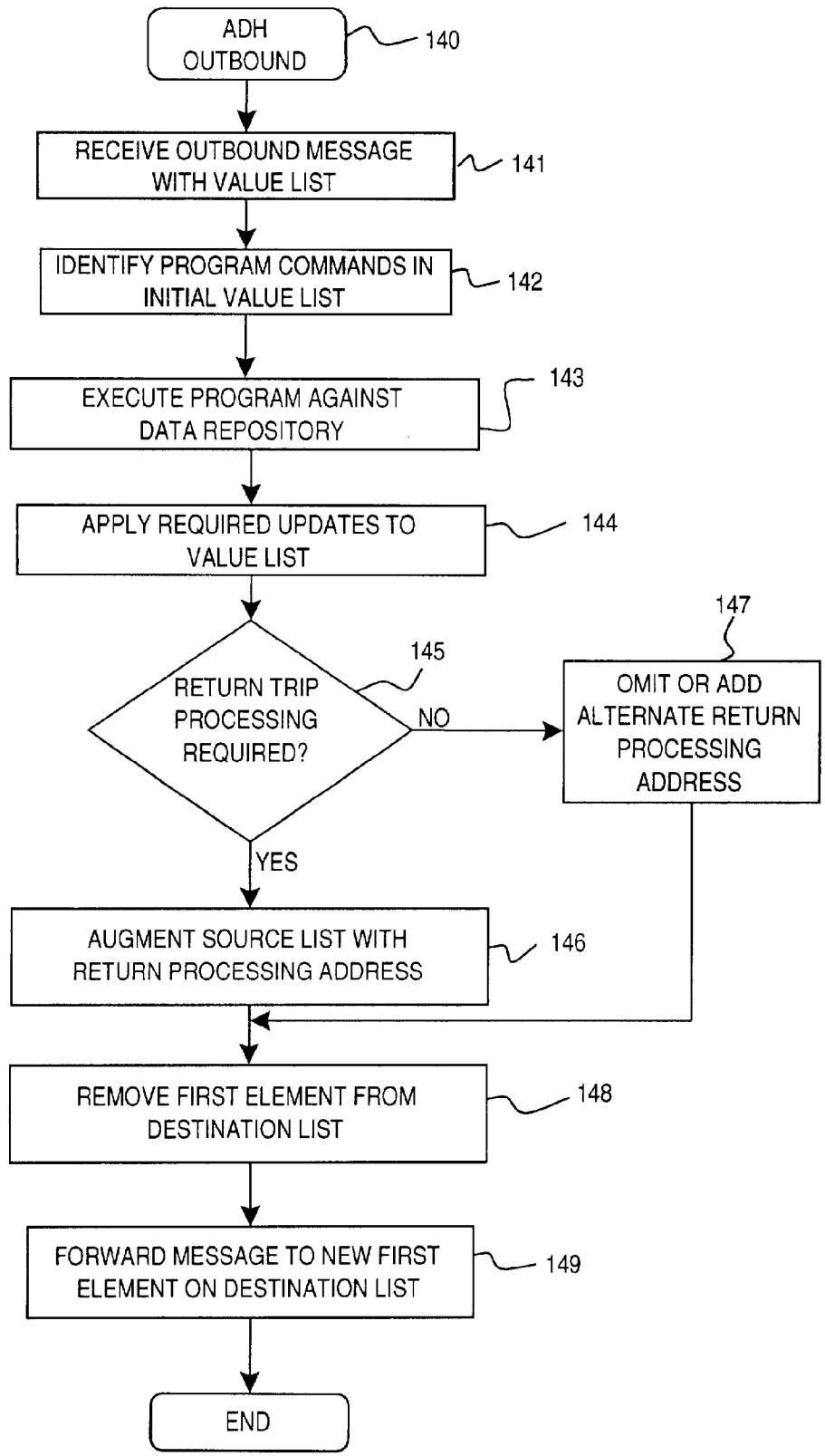
FIG. 9 is a flow diagram of a procedure for processing an outbound message using the application data handler of FIG. 8.

FIG. 9 is a flow diagram of a procedure for processing an outbound message 140 using one of the application data handlers 92A–C of FIG. 8. Its purpose is to receive a message for a unit of work from an "upstream" source, such as the OpenPM engine 20, and forward the message to one of the business objects 93A–C upon completion of processing. An outbound message with a value list is initially received by an application data handler 92A (block 141) as the destination node named in the first element on the destination address list in the outbound message. The application data handler 92A identifies program commands in the initial value list (block 142). The program associated with the description in an element in the initial value list is executed by the application data handler 92A against a data repository in one of the business databases 94AC (block 143). Any required updates are applied to the value list (block 144). If return trip processing of the outbound message is required (block 145), the application data handler 92A augments the source address list in the outbound message with a return processing address (block 146). Otherwise, if return trip processing of the outbound message is not required (block 145), the return processing address is omitted or an alternate return processing address is added to the source address list (block 147). The application data handler 92A then removes the first element on the destination address list of the outbound message (block 148) and forwards the outbound message to the destination node named in the new first element on the destination address list (block 149). The routine then ends.

Figure 10:
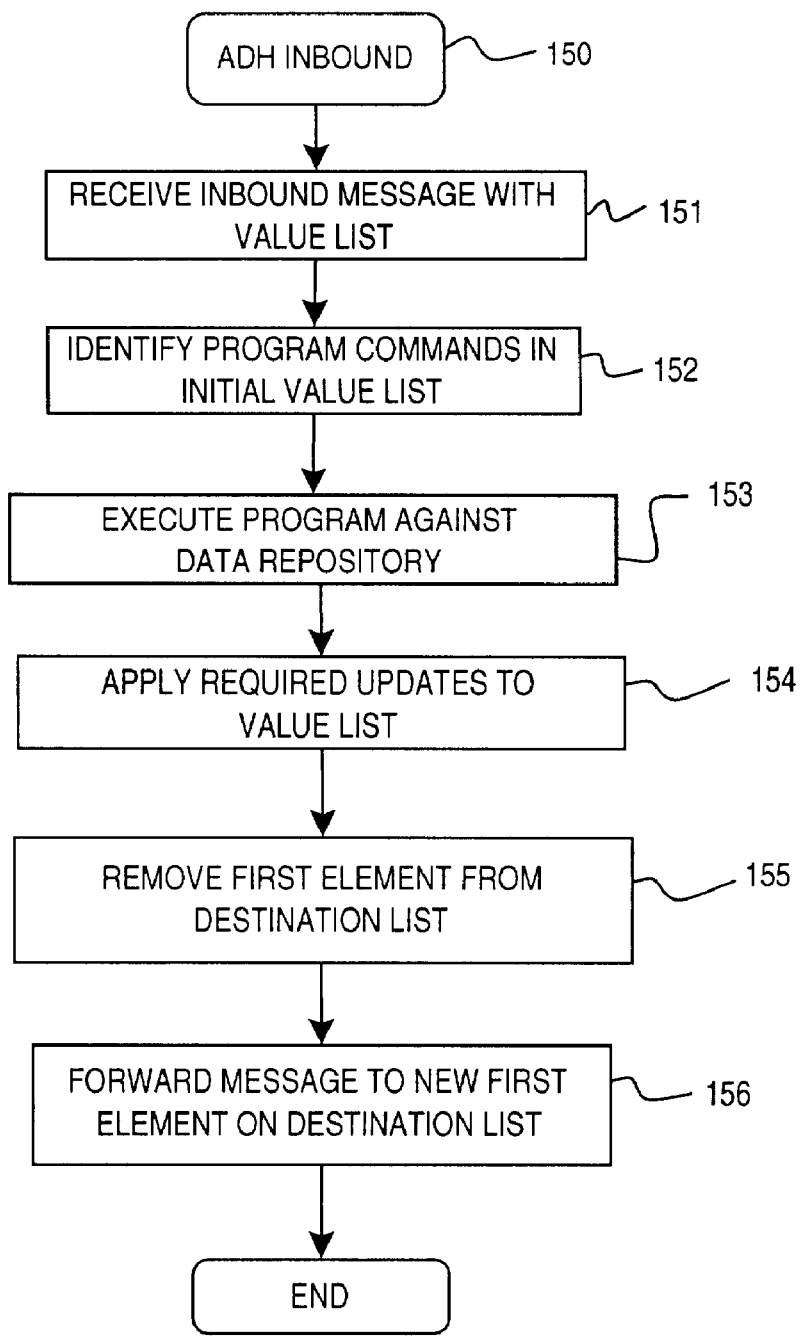
FIG. 10 is a flow diagram of a procedure for processing an inbound message using the application data handler of FIG. 8.

FIG. 10 is a flow diagram of a procedure for processing an inbound message 150 using one of the application data handlers 92A–C of FIG. 8. The procedure for processing an inbound message 150 is similar to the procedure for processing an outbound message 140. Its purpose is to receive a message for a unit of work from a "downstream" source, such as one of the business objects 93A–C, and forward the message to the OpenPM engine 20 upon completion of processing. An inbound message with a value list is initially received by an application data handler 92A (block 151) as the destination node named in the first element on the destination address list in the outbound message. The application data handler 92A identifies program commands in the initial value list (block 152). The program associated with the description in an element in the initial value list is executed by the application data handler 92A against a data repository in one of the business databases 94A–C (block 153). Any required updates are applied to the value list (block 154). The application data handler 92A removes the first element on the destination address list of the inbound message (block 155) and forwards the inbound message to the destination node named in the new first element on the destination address list (block 156). The routine then ends.

Figure 11:
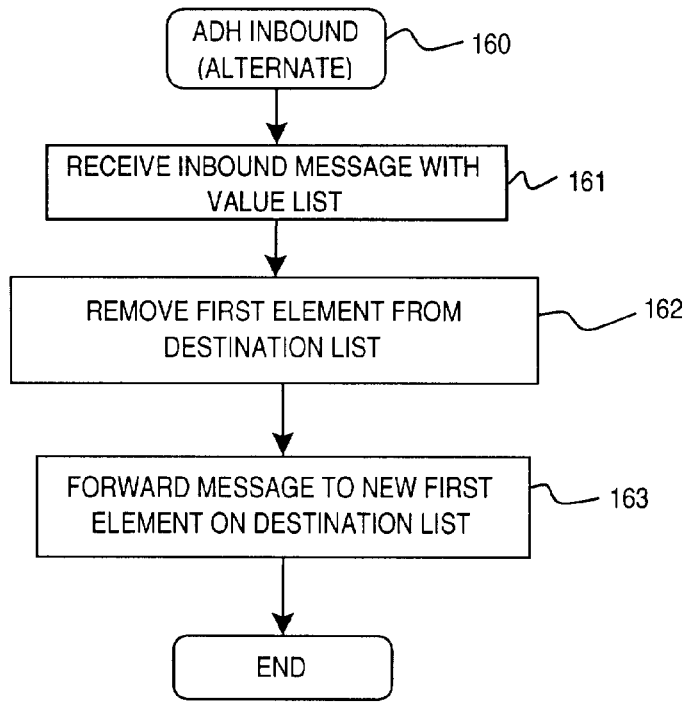
FIG. 11 is a flow diagram of an alternate procedure for processing an outbound message using the application data handler of FIG. 8.

FIG. 11 is a flow diagram of an alternate procedure for processing an outbound message 160 using one of the application data handlers 92A–C of FIG. 8. The alternate procedure for processing an inbound message 160 is a streamlined version of the procedure for processing an inbound message 140 which omits the program processing steps. Its purpose is also to receive a message for a unit of work from a "downstream" source, such as one of the business objects 93A–C, and forward the message to the OpenPM engine 20. An inbound message with a value list is initially received by an application data handler 92A (block 161) as the destination node named in the first element on the destination address list in the outbound message. The application data handler 92A removes the first element on the destination address list of the inbound message (block 162) and forwards the inbound message to the destination node named in the new first element on the destination address list (block 163). The routine then ends.

Worklist Handlers

Referring back to FIG. 8, the worklist handlers 91A–C add to the scalability of the OpenPM engine 20 by providing access to available units of work to the resources which actually perform the work. This enables each resource to function in a "pull" mode whereby a list of available work can be accessed and the resource can select an unit of work to perform. However, an alternative approach enables each resource to also function in a "push" mode whereby the OpenPM engine 20 sends units of work out to each resource. Pushing work units is more efficient for the OpenPM engine 20 than pulling, as each work unit needs to be addressed by the OpenPM engine 20 only once. In a pull-mode system, the work unit needs to be handled by the OpenPM engine 20 each time a list of available work is obtained. The worklist handlers 91A–C convert from push-mode to pull-mode to thereby increase workflow processing efficiency.

As described below with reference to FIG. 12, the worklist handlers 91A–C queue up work in a work queue maintained by each worklist handler 91A and allow resources to interactively interrogate the work queue and select from the available work. Furthermore, as described below with reference to FIG. 13, each resource provides its credentials to a worklist handler 91A for validating one or more claims and requests lists of available work from the worklist handler 91A. The OpenPM engine 20 itself is not interrogated and is thereby freed up from the overhead incurred in dealing with these interactive requests from individual resources. This approach allows the OpenPM engine 20 to dispatch the work requests to the individual worklist handlers 91A–C once in a "fire-and-forget" mode while still providing resources with the convenience and power of an interface that allows them to interactively choose from available units of work.

In the described embodiment, there can be thousands of worklist handlers 91A–C running in the system architecture. Individual resources can connect to an appropriate worklist handler 91A from wherever they happen to be within the system. This flexibility provides mobile resources with a rendezvous point. Moreover, designated resources possessing the authority to make multiple unrelated claims are thus able to connect to more than one worklist handler 91A–C.

Figure 12:
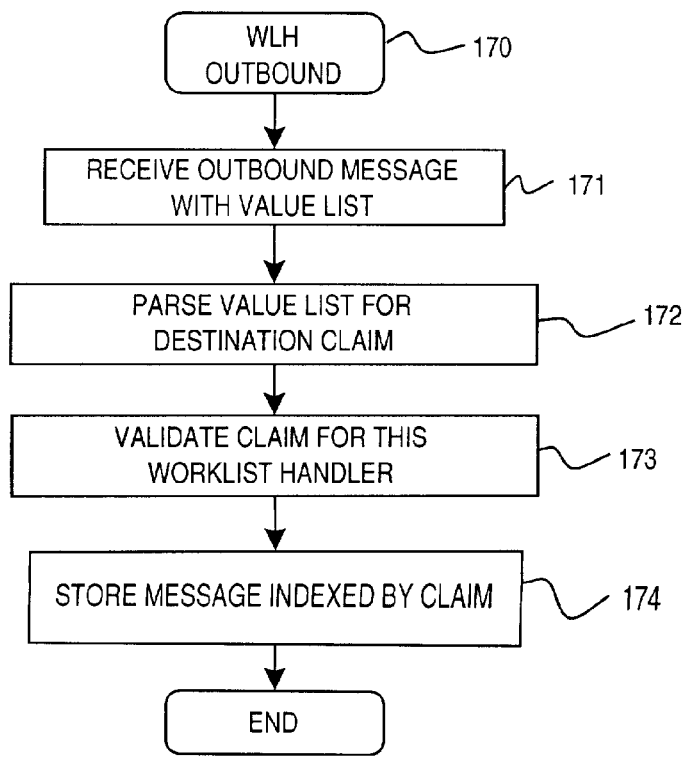
FIG. 12 is a flow diagram of a procedure for processing an outbound message using the worklist handler of FIG. 8.

FIG. 12 is a flow diagram of a procedure for processing an outbound message 170 using one of the worklist handlers 91A–C of FIG. 8. Its purpose is to receive a message for a unit of work from an "upstream" source, such as the OpenPM engine 20, and queue the unit of work for later selection by a resource, such as a business object 93A. An inbound message with a value list is initially received by an worklist handler 91A (block 171) as the destination node named in the first element on the destination address list in the outbound message. The value list for a destination claim is parsed (block 172) and the claim is validated for this worklist handler 91A (block 173). The outbound message is then stored using the claim as its index (block 174). The routine then ends.

Figure 13:
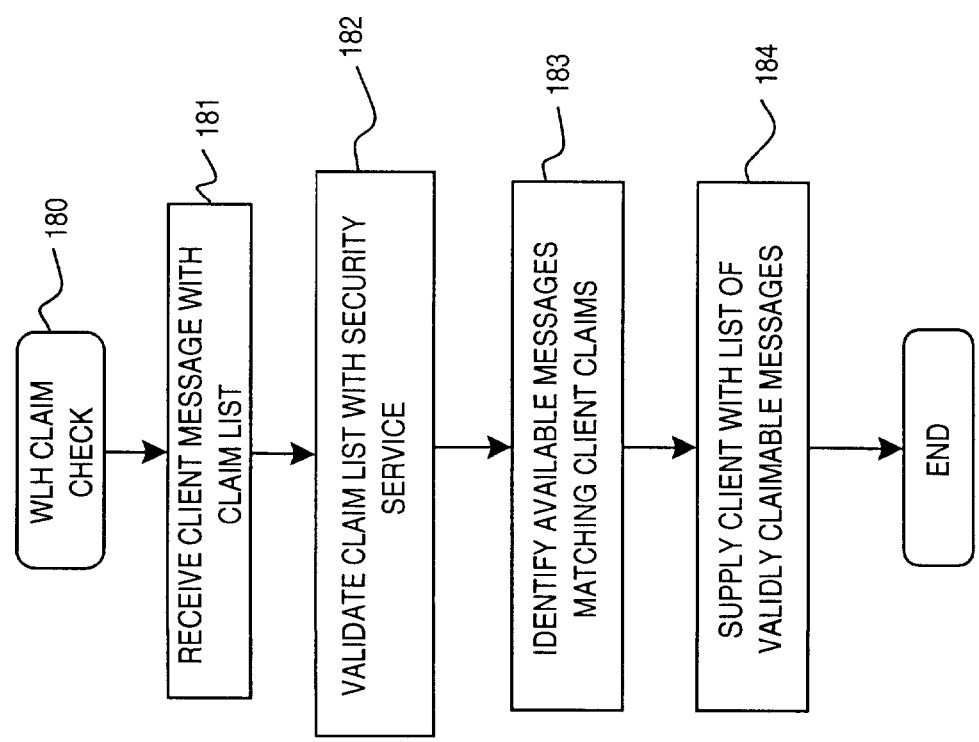
FIG. 13 is a flow diagram of procedure for processing a claim check using the worklist handler of FIG. 8.

FIG. 13 is a flow diagram of procedure for processing a claim check using the worklist handler of FIG. 8. Its purpose is to respond to a request for a selected unit of work from a resource, such as a business object 91A. A client message with a claim list is received by one of the worklist handlers 91A–C (block 181). The claim list is validated with a security service, such as described above with reference to FIG. 5 (block 182). Available messages stored in the work queue which match the indexes of client claims are identified (block 183). The client is supplied with a list of validly claimable messages (block 184). The routine then ends.

Transport Managers

Figures 14, 15:
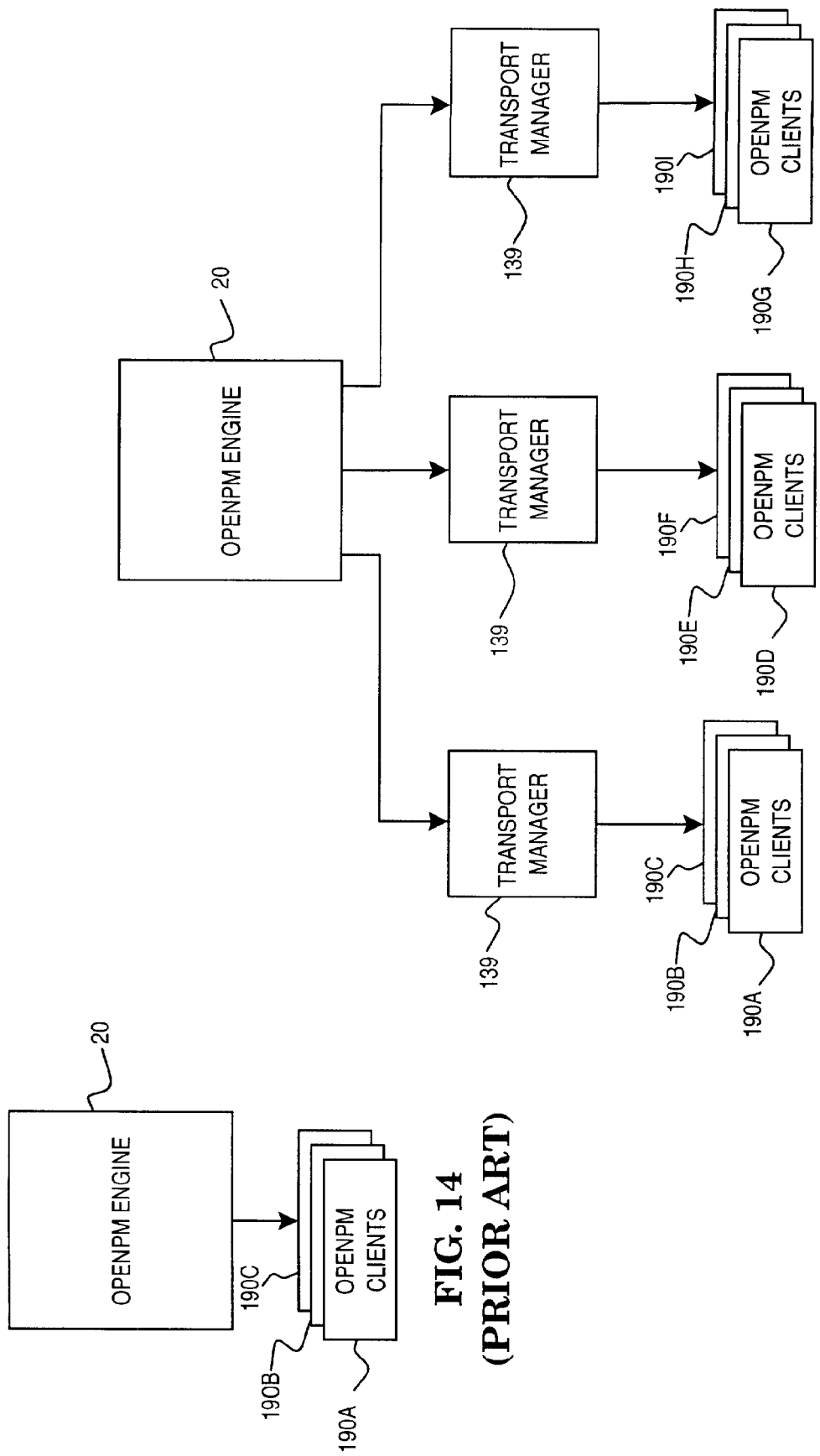
FIG. 14 is an example showing the high communications costs in a prior art process flow system.
FIG. 15 is an example showing the scalable communications costs in process flow system of FIG. 8.

Referring back to FIG. 8, the transport managers 139A–C provide for a more scalable architecture by decreasing and decentralizing the processing overhead that the OpenPM engine 20 is required to provide to all of the business objects 93A–C. FIG. 14 is an example showing the high communications costs in a prior art process flow system. The OpenPM engine 20 interfaces with each of the individual OpenPM clients 190A–C. The total aggregate communications cost is borne by the OpenPM engine 20. FIG. 15 is an example showing the scalable communications costs in process flow system of FIG. 8. The OpenPM engine 20 interfaces with a plurality of transport managers 139A–C which in turn each interface with a plurality of OpenPM clients 190A–I. However, the aggregate communications cost is shared by the OpenPM engine 20 and the transport managers 190A–C with the latter shouldering the bulk of the cost.

In the described embodiment, the OpenPM engine 20 employs a fan-out architecture and maintains CORBA references to a set of transport managers 190A–C which in turn maintain references to the downstream OpenPM clients 190A–I, that is, business objects 93A–C. This approach allows for a substantial fan-out and greatly reduces the load on the OpenPM engine 20 needed to maintain the communication connections.

Figure 16:
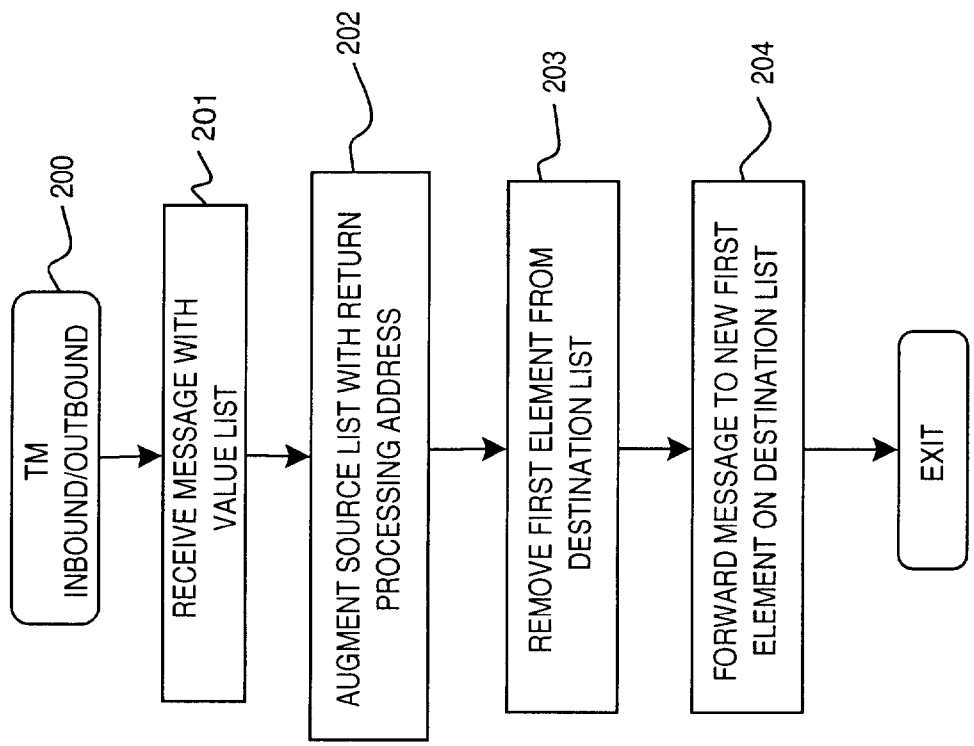
FIG. 16 is a flow diagram of procedure for processing an inbound or outbound message using the transport manager of FIG. 8.

FIG. 16 is a flow diagram of procedure for processing an inbound or outbound message 200 using one of the transport managers 139A–C of FIG. 8. Its purpose is to receive a message for a unit of work from either an "upstream" or "downstream" source and forward the message accordingly to thereby free up the OpenPM engine 20. A message with a value list is initially received by a transport manager 139A (block 201) as the destination node named in the first element on the destination address list in the message. The transport manager 91A augments the source address list in the message with a return processing address (block 202) and removes the first element on the destination address list of the message (block 203). The transport manager 91A then forwards the message to the destination node named in the new first element on the destination address list (block 204). The routine then ends.

Having described and illustrated the principles of the invention in a preferred embodiment thereof, it should be apparent that the invention can be modified in arrangement and detail without departing from such principles. We claim all modifications and variations coming within the spirit and scope of the following claims.

We claim:

1. A system for performing scalable distribution of process flow activities in a distributed workflow management system, comprising:

a computer network comprising a plurality of interconnected computers, each computer including a processor, memory and input/output facilities, the distributed workflow management system operating over the computer network;

a plurality of resources which are each operatively coupled to at least one of the computers and execute at least one of the activities in the process flow;

a process flow engine, including a database in which is stored data used in effecting each of the process flow activities, the process flow engine coordinating and scheduling execution of the process flow activities on the resources; and bidirectional proxy components operatively interposed between the process flow engine and the resources, the bidirectional proxy components comprising logic for handling application data for the resources, logic for handling worklists for access by the resources and logic for managing transport of messages between the process flow engine and each of the resources.

2. A system according to claim 1, wherein the database of the process flow engine categorizes the data into process-specific data used in effecting the process flow, application-specific data used in effecting the process flow activities and process-relevant data used in effecting the process flow and the process flow activities.

3. A system according to claim 1, further comprising a generic database associated with the distributed workflow management system and whereby the logic for handling application data comprises a plurality of application data handler, each application data handler being associated with one of the resources, each application data handler comprising:

means for accessing data stored in the generic database;
means for augmenting the accessed data with data specific to the activity prior to the execution of the at least one process flow activity on the associated resource; and
means for storing back changes in the data to the generic database.

4. A system according to claim 3, wherein the generic database comprises the database of the process flow engine, the means for accessing data further comprising means for accessing the data stored in the database of the process flow engine and the means for storing back changes further comprising means for storing back changes in the data to the database of the process flow engine.

5. A system according to claim 3, wherein the generic database comprises a further database substantially distinct from the database of the process flow engine, the means for accessing data further comprising means for accessing data stored in the further database and the means for storing back changes further comprising means for storing back changes in the data to the further database.

6. A system according to claim 3, the application data handler further comprising means for providing transactional semantics to a plurality of the process flow activities, the transactional semantics including means for obtaining data from the database of the process flow engine for each resource.

7. A system according to claim 1, whereby the logic for handling worklists for access by the resources comprises a plurality of worklist handlers, each worklist handler being associated with one of the resources, each worklist handler comprising:

a queue of work to be performed by the resources in effecting the process flow activities, the process flow engine further comprising means for dispatching work requests to each work queue of the worklist handlers;
an interface enabling each resource to interactively access the work queue of the associated worklist handler; and
means for selecting the work to be performed by the resource to effect one such process flow activity.

8. A system according to claim 1, whereby the logic for managing transport of messages between the process flow engine and each of the resources comprises a plurality of transport managers, each transport manager being associated with one of the resources, each transport manager comprising:

a first message interface between the process flow engine and the transport manager;
a second message interface between the transport manager and each associated resource; and
means for exchanging the messages between the flow process engine and each associated resource via the first and second message interfaces.

9. A method for performing scalable distribution of process flow activities in a distributed workflow management system, the distributed workflow management system operating over a computer network comprising a plurality of interconnected computers and a plurality of resources, each computer including a processor, memory and input/output facilities, each resource operatively coupled to at least one of the computers and executing at least one of the activities in the process flow, the method comprising the steps of:

coordinating and scheduling the execution of the process flow activities on the resources using a process flow engine, including storing data used in effecting each of the process flow activities in a database of the process flow engine;
providing application data accessed from the database of the process flow engine to the resources using a application data handler interposed between the resources and process flow engine;
managing worklists for access by the resources using a worklist handler interposed between the resources and process flow engine; and
transporting messages between the process flow engine and each of the resources using a transport manager interposed between the resources and process flow engine.

10. A method according to claim 9, further comprising the steps of:

providing process-specific data used in effecting the process flow into the database of the process flow engine;
providing application-specific data used in effecting the process flow activities into the database of the process flow engine; and
providing process-relevant data used in effecting the process flow and the process flow activities into the database of the process flow engine, the step of handling application data using the application data handler further comprising augmenting the process-relevant data augmented with the application-specific data.

11. A method according to claim 9, wherein the distributed workflow management system further comprises a generic database and the step of providing application data further comprises the steps of:

accessing data stored in the generic database;
augmenting the accessed data with data specific to at least one such activity to be performed by one of the associated resources prior to the execution of the at least one process flow activity on the associated resource; and
storing back changes in the data to the generic database upon completion of the execution.

12. A system according to claim 11, wherein the generic database comprises the database of the process flow engine, the step of accessing data further comprising accessing the data stored in the database of the process flow engine and the step of storing back changes further comprising storing back changes in the data to the database of the process flow engine.

13. A system according to claim 11, wherein the generic database comprises a further database substantially distinct from the database of the process flow engine, the step of accessing data further comprising accessing data stored in the further database and the step of storing back changes further comprising storing back changes in the data to the further database.

14. A method according to claim 11, further comprising the step of providing transactional semantics to a plurality of the process flow activities, the transactional semantics including means for obtaining data from the database of the process flow engine for each resource.

15. A method according to claim 9, wherein the step of managing worklists further comprises the steps of:
    maintaining a queue of work to be performed by the resources in effecting the process flow activities, the step of coordinating and scheduling further comprising dispatching work requests to each work queue of the worklist handlers using the process flow engine;
    accessing the work queue of the associated worklist handler interactively from each resource an interface on each worklist handler; and
    selecting the work to be performed by the resource to effect one such process flow activity.

16. A method according to claim 9, wherein the step of transporting messages further comprises the steps of:
    providing a first message interface between the process flow engine and the transport manager;
    providing a second message interface between the transport manager and each associated resource; and
    exchanging the messages between the flow process engine and each associated resource via the first and second message interfaces.

17. A method for managing process flow activities in a distributed processing environment, each of the process flow activities comprising units of work performed by a resource operating within the distributed processing environment, the method comprising the steps of:
    coordinating the process flow activities using a process management engine operating on a computer system within the distributed processing enviromnment, the process management system identifying the work units to be performed;
    augmenting data maintained by the process management engine with further data specific to each such process flow activity using an application data handler functionally interposed between the process management engine and each such resource within the distributed processing enviromnment;
    maintaining a list of the work units using a worklist handler functionally interposed between the process management engine and each such resource within the distributed processing environment, the process management engine providing the work units list to the worklist handler and each such resource interactively selecting such work units from the work units list; and
    exchanging messages containing descriptions of the work units using a transport manager functionally interposed between the process management engine and each such resource within the distributed processing environment, each such resource interpreting the descriptions for the selected work units.

18. A method according to claim 17, wherein the step of augmenting data further comprises the steps of:
    processing an outbound message received from the process management engine for dispatch to one of the resources; and
    processing an inbound message received from one of the resources for dispatch to the process management engine.

19. A method according to claim 18, wherein the step of processing an outbound message further comprises the steps of:
    receiving the outbound message with a value list from the process management engine for dispatch to one of the resources, the value list comprising a destination address list, a source address list and program commands;
    identifying the program commands in the value list;
    executing the program commands against a data repository associated with one of the resources in the destination address list;
    augmenting the source address list with a return processing address if return trip processing of the outbound message is required;
    omitting or adding an alternate processing address if return trip processing is not required;
    removing a first element from the destination address list to thereby form a new first element in the destination address list; and
    forwarding the message to one of the resources as determined by the new first element in the destination address list.

20. A method according to claim 18, wherein the step of processing an inbound message further comprises the steps of:
    receiving the inbound message with a value list from the process management engine for dispatch to one of the resources, the value list comprising a destination address list, a source address list and program commands;
    identifying the program commands in the value list;
    executing the program commands against a data repository associated with one of the resources in the destination address list;
    applying required updates against the data repository associated with one of the resources in the destination address list;
    removing a first element from the destination address list to thereby form a new first element in the destination address list; and
    forwarding the message to one of the resources as determined by the new first element in the destination address list.

21. A method according to claim 18, wherein the step of processing an inbound message further comprises the steps of:
    receiving the inbound message with a value list from the process management engine for dispatch to one of the resources, the value list comprising a destination address list, a source address list and program commands;
    removing a first element from the destination address list to thereby form a new first element in the destination address list; and
    forwarding the message to one of the resources as determined by the new first element in the destination address list.

22. A method according to claim 17, wherein the step of maintaining a list of work units further comprises the steps of:
    processing an outbound message received from the process management engine for dispatch to one of the resources; and checking a claim from one of the resources against the outbound message.

23. A method according to claim 19, wherein the step of processing an outbound message further comprises the steps of:

receiving the outbound message with a value list from the process management engine for dispatch to one of the resources, the value list comprising a destination address list, a source address list and program commands;

parsing the value list for a destination claim;

validating the destination claim for the worklist handler against the work units identified by the process management engine; and storing the outbound message in the worklist handler using the claim as an index to the stored outbound message.

24. A method according to claim 19, wherein the step of checking a claim further comprises the steps of:

receiving a client message with a claim list from a client corresponding to one of the resources;

validating the claim list with a security service associated with the worklist handler against outbound messages stored in the worklist handler;

identifying available messages in the worklist handler matching the client claims, each of the matching available messages having an index corresponding to one of the client claims; and supplying the client resource with a list of validly claimable messages.

25. A method according to claim 17, wherein the step of exchanging messages further comprises the step of processing a message, the message comprising either an outbound message or an inbound message.

26. A method according to claim 23, wherein the step of exchanging messages further comprises the steps of:

receiving the message with a value list from the process management engine for dispatch to one of the resources, the value list comprising a destination address list, a source address list and program commands;

augmenting the source address list associated with the message with a return processing address;

removing a first element from the destination address list to thereby form a new first element in the destination address list; and forwarding the message to one of the resources as determined by the new first element in the destination address list.

* * * * *